US010311103B2

(12) United States Patent
Qiao et al.

(10) Patent No.: US 10,311,103 B2
(45) Date of Patent: Jun. 4, 2019

(54) INFORMATION SEARCH METHOD, DEVICE, SERVER AND STORAGE MEDIUM

(71) Applicant: Baidu Online Network Technology (Beijing) Co., Ltd., Beijing (CN)

(72) Inventors: Min Qiao, Beijing (CN); Jingting Jin, Beijing (CN); Weiwei Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 576 days.

(21) Appl. No.: 14/894,965

(22) PCT Filed: Aug. 22, 2014

(86) PCT No.: PCT/CN2014/085069
§ 371 (c)(1),
(2) Date: Apr. 29, 2016

(87) PCT Pub. No.: WO2015/024533
PCT Pub. Date: Feb. 26, 2015

(65) Prior Publication Data
US 2016/0239501 A1     Aug. 18, 2016

(30) Foreign Application Priority Data
Aug. 22, 2013  (CN) .......................... 2013 1 0369972

(51) Int. Cl.
*G06F 7/00*     (2006.01)
*G06F 17/30*    (2006.01)
(Continued)

(52) U.S. Cl.
CPC ........ *G06F 16/7867* (2019.01); *G06F 16/285* (2019.01); *G06F 16/43* (2019.01); *G06F 16/739* (2019.01); *G06F 16/9535* (2019.01)

(58) Field of Classification Search
CPC .... G06F 16/7867; G06F 16/43; G06F 16/285; G06F 16/739; G06F 16/9535; G06F 17/30; G06F 17/3053; G06F 17/30867
See application file for complete search history.

(56) References Cited

U.S. PATENT DOCUMENTS

| 7,460,149 B1 | 12/2008 | Donovan et al. | |
| 2009/0150920 A1* | 6/2009 | Jones | G06Q 30/02 725/23 |

(Continued)

FOREIGN PATENT DOCUMENTS

| CN | 102024009 A | 4/2011 |
| CN | 102063476 A | 5/2011 |
| CN | 103473273 A | 12/2013 |

OTHER PUBLICATIONS

International Search Report in PCT/CN2014/085069 dated Nov. 21, 2014 in 4 pages.

(Continued)

*Primary Examiner* — Azam M Cheema
(74) *Attorney, Agent, or Firm* — Knobbe Martens Olson & Bear LLP

(57) ABSTRACT

An information search method includes: receiving a client query keyword; acquiring, in a regular index database, a first search result associated with the query keyword; and querying, according to the query keyword, video and product summary information in a video product index database to acquire a second search result associated with the query keyword. The second search result has an address of a video clip associated with the query keyword, and the video product index database has the address of the video clip. The video summary information corresponds to the video clip, and the product summary information corresponds to a product demonstrated in the video clip. The first and second search results are pushed to the client. Improved user search (Continued)

efficiency, enriched search result of a querying, and shortened gap between the search result and the user's actual query demands are expected.

13 Claims, 4 Drawing Sheets

(51) Int. Cl.
*G06F 16/78* (2019.01)
*G06F 16/28* (2019.01)
*G06F 16/9535* (2019.01)
*G06F 16/738* (2019.01)
*G06F 16/43* (2019.01)

(56) References Cited

U.S. PATENT DOCUMENTS

2009/0235150 A1* 9/2009 Berry ................ G06F 17/30038
715/205
2011/0282906 A1  11/2011 Wong

OTHER PUBLICATIONS

Tsinaraki, Chrisa et al., "Towards a Two-Layered Video Metadata Model" 2001 IEEE, pp. 937-940, Dec. 31, 2001.

* cited by examiner

INFORMATION SEARCH METHOD, DEVICE, SERVER AND STORAGE MEDIUM

CROSS REFERENCE TO RELATED APPLICATIONS

This application is the U.S. National Phase Application under 35 U.S.C. § 371 of International Application No. PCT/CN2014/085069, filed Aug. 22, 2014, designating the U.S. and published as WO2015/024533A1 on Feb. 26, 2015 which claims the benefit of Chinese Patent Application No. 201310369972.3, filed Aug. 22, 2013. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to the field of communication technology and computer, and more particularly, to an information search method, device, server and storage medium.

BACKGROUND

With rapid development of computer network technologies, a search engine gradually becomes the foremost and the most convenient means for people to obtain information. Since its appearance, the search engine has gone through the first generation of classified catalog era, the second generation of text retrieval era and the third generation of link analysis era, and now it enters into the fourth generation of user-centered era. The search engine in the fourth generation is user-centered. When users input query requests, the same query keyword inputted by different users may correspond to different query requests. In addition, for the same keyword inputted by the same user in different time and on different occasions, search results expected to be obtained may be different. Therefore, it is a problem dedicated to solving by all mainstream search engines, i.e., how to determine search results that are really needed by users according to a brief keyword inputted by the users.

In the existing search engine, information on various products appeared in a video and a video clip corresponding to each of the various products may not be provided. However, in many cases, users may need to acquire the above contents. For users' demands in this respect, two examples are taken as below:

(1) Users are interested in a product (for example: actors' costumes, foodstuffs, consumer goods and scenic spots or the like) appeared in a video and expect to retrieve detailed information on the product by means of the search engine. Or, users are interested in a certain person or a certain organization and expect to know products that had been used by the person or the organization.

(2) Users are interested in a certain product and have potential purchasing demands and thus expect to obtain a video clip, in which the product appeared, as an auxiliary video to know the product more comprehensively.

With respect to demand (1), the existing search engine is unable to directly provide a video clip corresponding to the product. A user need to input the query keyword accurately describing articles in the video to the search engine so that the search engine may retrieve related results from existing information in the Internet and submit them to the user. Such results basically are information based on words and pictures, for example, information replied by network users or information provided by website editors. The reference value of such information may be not high due to artificial transformation. Or, there is no direct search result at all, and the user needs mining and retrieval at a deeper level.

With respect to demand (2), the existing search engine may be able to provide only auxiliary videos such as advertising films or propaganda films of the product, and is unable to provide videos of other types. Thus, more detailed information is unable to be provided to users.

SUMMARY

In view of above description, the present invention provides an information search method, device, a server and a storage medium. After a query keyword is inputted into a client, information on various products appeared in a certain video and a video clip corresponding to various products may be acquired, or product information corresponding to a certain product and a video clip in which the product appeared may be acquired, which may improve a user's search efficiency, enrich a search result of a querying, and shorten a gap between the search result and the user's actual query demand.

In a first aspect, embodiments of the present invention provide an information search method, including:
receiving a query keyword from a client;
acquiring, in a regular index database, a first search result associated with the query keyword;
querying, according to the query keyword, video summary information and product summary information in a video product index database to acquire a second search result associated with the query keyword, wherein the second search result comprises an address of a video clip associated with the query keyword, and the video product index database comprises the address of the video clip, the video summary information corresponding to the video clip, and the product summary information corresponding to a product demonstrated in the video clip; and
pushing the first search result and the second search result to the client.

In a second aspect, embodiments of the present invention provide an information search device, including:
a receiving unit, configured to receive a query keyword from a client;
a first search result acquisition unit, configured to acquire, in a regular index database, a first search result associated with the query keyword;
a second search result acquisition unit, configured to query, according to the query keyword, video summary information and product summary information in a video product index database to acquire a second search result associated with the query keyword, wherein the second search result comprises an address of a video clip associated with the query keyword, and the video product index database comprises the address of the video clip, the video summary information corresponding to the video clip, and the product summary information corresponding to a product demonstrated in the video clip; and
a search result pushing unit, configured to push the first search result and the second search result to the client.

In a third aspect, embodiments of the present invention provide a server, including the information search device.

In a fourth aspect, embodiments of the present invention provide one or more storage media containing a computer-executable instruction used for executing an information search method, which includes the following steps:

receiving a query keyword from a client;

acquiring, in a regular index database, a first search result associated with the query keyword;

querying, according to the query keyword, video summary information and product summary information in a video product index database to acquire a second search result associated with the query keyword, wherein the second search result comprises an address of a video clip associated with the query keyword, and the video product index database comprises the address of the video clip, the video summary information corresponding to the video clip, and the product summary information corresponding to a product demonstrated in the video clip; and pushing the first search result and the second search result to the client.

The embodiments of the present invention pre-establish a video product index database, and acquire the search result in the foregoing video product index database, in addition to the search result in the regular index database when the query keyword of the client is received. In this way, after receiving a user's search keyword, the client may acquire information on various products appeared in a certain video and video clip information corresponding to various products, or product information corresponding to a certain product and video clip information in which the product appeared, thereby improving the user's search efficiency, enriching a search result of a querying, and shortening a gap between the search result and the user's actual query demand.

DETAILED DESCRIPTION OF THE EMBODIMENTS

To make the objectives, technical solutions, and advantages of the present invention clearer, the following describes in detail the embodiments of the present invention with reference to the accompanying drawings. It is to be understood that the embodiments set forth herein are merely intended for interpreting the present invention, but not for limiting the present invention. Additionally, it should also be noted that, for the convenience of description, the accompanying drawings merely show parts correlated to the present invention instead of all contents.

Embodiment I

Figure 1:
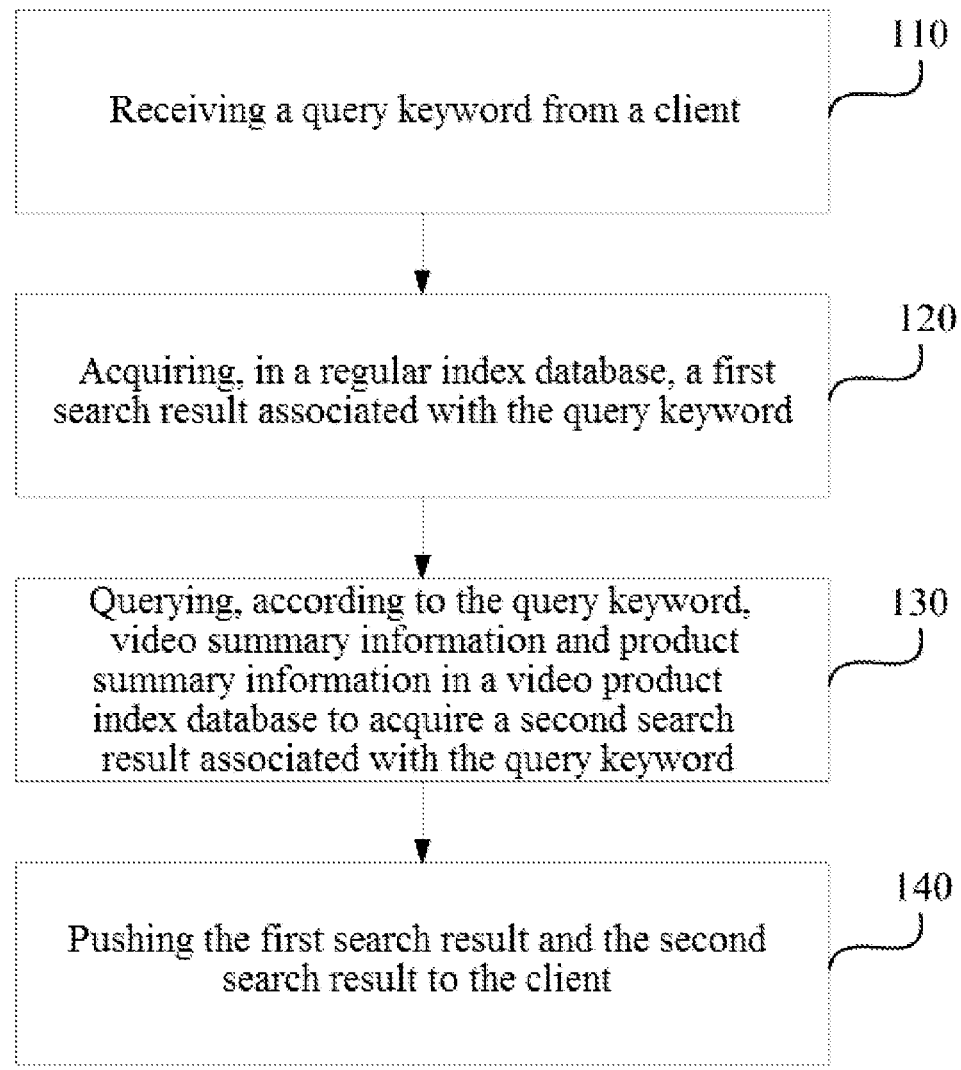
FIG. 1 is a flowchart of the information search method according to a first embodiment of the present invention.

FIG. 1 is a flowchart of the information search method according to the first embodiment of the present invention. As shown in FIG. 1, the method includes the following steps:

In Step 110, a query keyword is received from a client.

In the present embodiment, a server (for example, a backend server used by the search engine) used for receiving the query keyword from the client may receive the query keyword from the client by means of a wired or wireless data network connection.

In the present embodiment, the wireless data network connection includes, but is not limited to, 3G (3rd-generation) connection, Wi-Fi (Wireless Fidelity) connection, Bluetooth connection, WiMAX (Worldwide Interoperability for Microwave Access) connection, Zigbee connection, UWB (ultra wideband) connection or other wireless connection to be developed in the future.

By means of a wired or wireless data network connection, the server may receive the query keyword from the client through the network instantly, or the server may receive the query keyword from the client through the network indirectly and not instantly (for example, transited by a message storage server).

In the present embodiment, the query keyword may be one or more Chinese characters or English words or combination of both.

In Step 120, a first search result associated with the query keyword is acquired from a regular index database.

In the present embodiment, the regular index database refers to an index database that is widely used by the existing search engine and that stores association relationship between the query keyword and the search result. The search result associated with the query keyword may be searched out from the regular index database by using the query keyword. Specifically, the regular index database may be implemented as a Key-Value (Key/Value) database or other association databases. For example, the query keyword is taken as a Key, and a page target URL (Uniform Resource Locator) in which association results exist is taken as a Value.

In the present embodiment, the regular index database may include one or more regular index sub-databases. For example, based on a feature of the target page, the regular index database may be classified into a video index sub-database, a music index sub-database, a picture index sub-database, and a news index sub-database, etc. A plurality of regular index sub-databases mentioned above may be stored in the same server or be classified and stored in different servers.

In Step 130, video summary information and product summary information are queried in a video product index database according to the query keyword to acquire a second search result associated with the query keyword.

In the present embodiment, the video product index database includes: the address of the video clip, the video summary information corresponding to the video clip, and the product summary information corresponding to a product displayed in a content of the video clip.

In the present embodiment, the video clip may be a video clip of films and television programs, an officially-produced commercial video, or a nonofficial video uploaded by a network user, etc. The product displayed in the content of the video clip may include consumer products appeared in the video, such as clothes, decorations, wallets, mobile phones, shoes, beverages or the like, or service products such as scenic spots, typical buildings, hotels, restaurants or the like.

In a preferred implementation of the present embodiment, the video summary information includes a video name corresponding to the video clip, and the product summary information includes a product name corresponding to the product displayed in the content of the video clip.

For example, a video clip taken from the movie "北京遇上西雅图 (Finding Mr. Right)" displays a 联想 K900 (Lenovo K900) mobile phone, wherein the storing address of the video clip is: www.example01.com/vod/play In the video product index database, fields of the video clip are stored in the form as shown in Table 1.

TABLE 1

| Video clip address | Video summary information | Product summary information |
|---|---|---|
| www.example01.com/vod/play | 北京遇上西雅图 (Finding Mr. Right) | Lenovo K900 |

In the present embodiment, the video summary information may further include other information related to the video, for example, names of starrings in the video, names of protagonists in the video, video thumbnails, temporal interval of the video clip taken from the whole video, and an entry address of the whole video, etc.

In the present embodiment, the product summary information may further include other information related to the product, for example, the product brand name, the product introduction, an entry address of the product detail page and the product schematic diagram, etc.

Of course, those skilled in the art should understand that the video summary information and the product summary information may further include other information related to the video or the product, to which no limitation is made.

In the present embodiment, data in the video product index database may be obtained from any organization or individual person, preferably, the producer of the video, the manufacturer of the product, and the operator of the video website, etc.

In the present embodiment, the server (a backend server) that processes the query keyword sent by the client searches the video summary information and the product summary information in the video product index database. When the query keyword corresponds to the video summary information or the product summary information, the address of the video clip corresponding to the corresponding video summary information or the product summary information is acquired and taken as the second search result associated with the query keyword.

For example, when the query keyword received by the server is "北京遇上西雅 图 (Finding Mr. Right)" or "Lenovo K900", the second search result acquired is: www.example01.com/vod/play.

In the present embodiment, the expression that the query keyword corresponds to the video summary information or the product summary information includes:

(1) The query keyword is identical to the video summary information or the product summary information. For example, the query keyword received by the server is "北京遇上西雅图 (Finding Mr. Right)" or "Lenovo K900";

(2) The similarity weight between the query keyword and the video summary information or the product summary information is greater than a predefined threshold. For example, the query keyword received by the server is "北京遇上西雅 图 (similar to, but not identical with, "Finding Mr. Right")" or "Lenovo G900".

Preferably, the similarity weight is defined as: K=1/D, wherein K is the similarity weight, D is a hamming distance between Chinese characters or English characters. The greater the distance between two characters is, the smaller the similarity weight is. Taking the predefined threshold being set as 0.8 as an example, when the calculated K is greater than 0.8, it is determined that the query keyword corresponds to the video summary information or the product summary information.

Of course, those skilled in the art should understand that other calculating method of the similarity weight and the value range of the predefined threshold may be also used, to which no limitation is made.

In a preferred implementation of the present embodiment, the second search result further includes video abstract information and/or product abstract information corresponding to the video clip, wherein the video abstract information is a subset of the video summary information, and the product abstract information is a subset of the product summary information.

For example, when the query keyword received by the server is "北京遇上西雅 图 (similar to, but not identical with, "Finding Mr. Right")", the second search result may include "北京爱上西雅图 (similar to, but not identical with, "Finding Mr. Right")" and/or "Lenovo K900", in addition to www.example01.com/vod/play.

In Step 140, the first search result and the second search result are pushed to the client.

In the present embodiment, after gathering the first search result and the second search result, the server may sort the first search result and the second search result according to a predetermined sorting rule, and pushes the sorted search results to the corresponding client.

For example, for an on-line application, the first search result and the second search result may be sorted according to user behavior attribute, authority attribute, and service stability attribute of the on-line application. The user behavior attribute includes a combination of one or more of the number of independent login users, the number of independent user conversations, the number of user arrivals, the number of loading application pages, the number of users participating in evaluation, the average score of user evaluation, the number of user collection and the number of user authorization. The authority attribute may also be set according to the user behavior attribute of the previous on-line application submitted by the developer of the on-line application and artificial judgment of an administrator. The service stability attribute may be a ratio of the number of requests to which a normal response page is returned within scheduled preset time period to the total number of user requests. By setting a sorting formula, a comprehensive assessment level is calculated, in which the user behavior attribute, the authority attribute, and the service stability attribute of the on-line application are comprehensively considered. The higher the finally calculated comprehensive assessment level is, the higher ranking is obtained.

According to the embodiments of the present invention, a video product index database is pre-establish, and when the query keyword is received from the client, the search result in the foregoing video product index database is obtained, in addition to the search result in the regular index database. After inputting a search keyword into the client, the user may acquire information on various products appeared in a certain video and video clip information corresponding to the various products, or product information corresponding to a certain product and video clip information in which the product appeared, thereby improving the user's search efficiency, enriching a search result of a querying, and shortening a gap between the search result and the user's actual query demand.

Embodiment II

Figure 2:
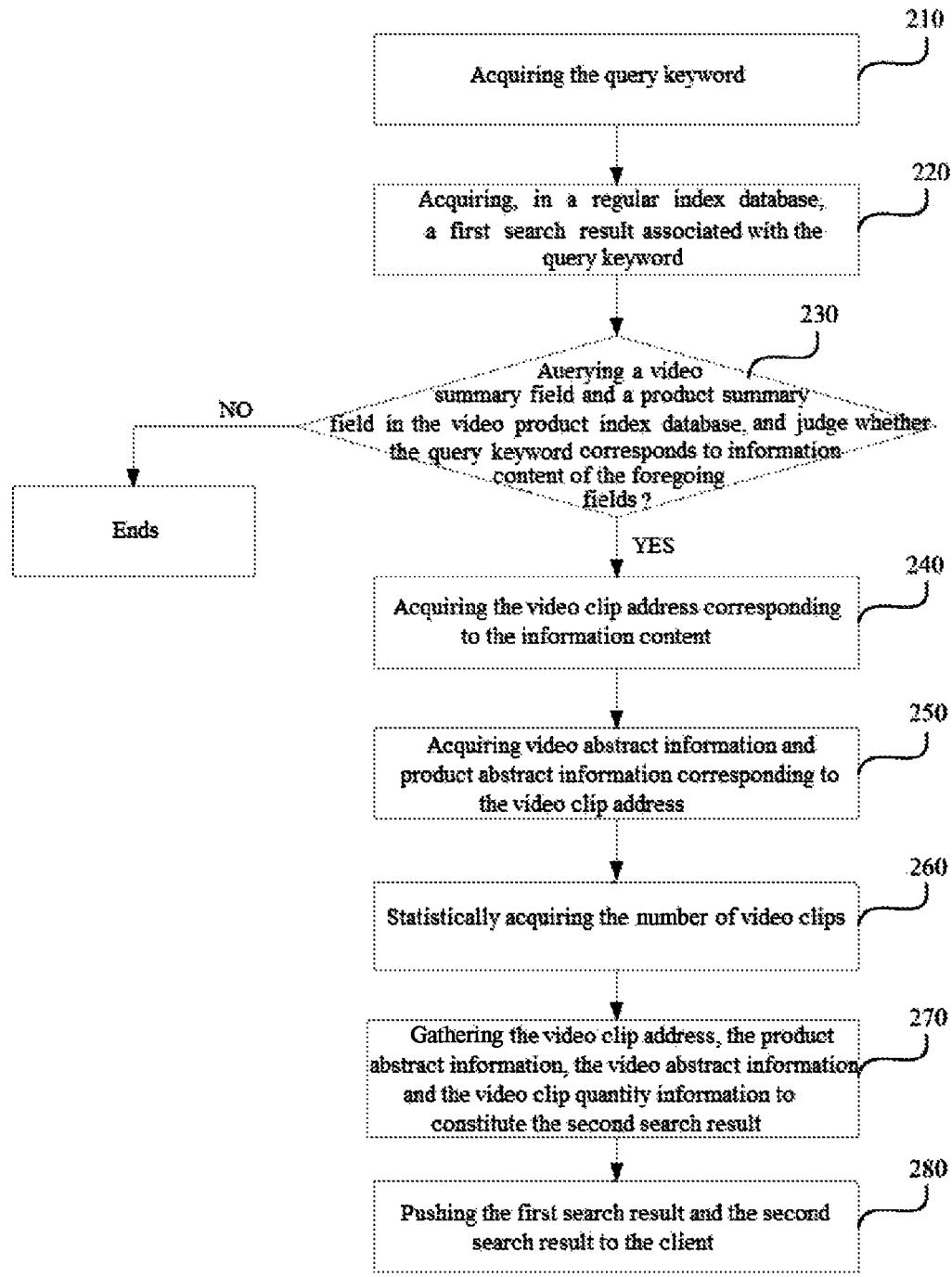
FIG. 2 is a flowchart of the information search method according to a second embodiment of the present invention.

FIG. 2 is a flowchart of the information search method according to the second embodiment of the present invention. As shown in FIG. 2, the method includes the following steps:

In Step 210, the query keyword is acquired.

The Step 210 in the present embodiment is the same as Step 110 in the first embodiment, and thus its detailed descriptions are omitted herein.

In Step 220, a first search result associated with the query keyword is acquired from a regular index database.

The Step 220 in the present embodiment is the same as Step 120 in the first embodiment, and thus its detailed descriptions are omitted herein.

In Step 230, a video summary field and a product summary field are queried in the video product index database, and it is determined whether the query keyword corresponds to information content in the foregoing fields. If the query keyword does not correspond to information content in the foregoing fields, the process is ended; otherwise, Step 240 is executed.

In the present embodiment, in addition to the address of the basic video clip, the video summary information corresponding to the video clip, and the product summary information corresponding to the product displayed in the content of the video clip, the video product index database also includes video abstract information and product abstract information, wherein the video abstract information is a subset of the video summary information, and the product abstract information is a subset of the product summary information.

Table 2 shows the storage form of fields in a video product index database.

In the present embodiment, the server may firstly search for a video summary field before searching for a product summary field, or firstly search for a product summary field before searching for the video summary information, to which no limitation is made.

In an embodiment, the server may firstly search for the video summary field, and then search for the product summary field if the video summary field does not include any content that corresponds to the query keyword. As shown in Table 2, when the query keyword received by the server includes the video name, names of starrings in the video and names of protagonists in the video, corresponding contents may be searched out in the video summary field. When no content that corresponds to the query keyword is stored in the video summary field, the server may turn to search in the product summary field. As shown in Table 2, when the query keyword received by the server includes the product name or the brand name, corresponding contents may be searched out in the product summary field.

For example, when the query keyword received by the server is "北京遇上西雅图 (Finding Mr. Right) (the film's name)", "汤唯 (the starring's name)" or "文佳佳 (the protagonist's name)", corresponding contents may be searched out in the video summary field; when the query keyword received by the server is "Lenovo K900" or "Lenovo", corresponding contents may be searched out in the product summary field.

TABLE 2

| Video address | Video summary | | Product summary | | Product abstract | Video abstract |
|---|---|---|---|---|---|---|
| www.example01.com/vod/play | Video name | 北京遇上西雅图 (Finding Mr. Right) | Product name | Lenovo K900 | Lenovo K900 | example.bmp |
| | Names of starrings in the video | 汤唯 吴秀波 | Brand name | Lenovo | | |
| | Names of protagonists | 文佳佳 Frank | Product introduction | Price 2580 | www.example.html | 13:02-15:20 |
| | Video clip thumbnail | example.bmp | Address of product details page | www.example.html | Price 2580 | |
| | Starting and ending time of a video clip | 13:02-15:20 | Product schematic diagram | | | |
| www.example02.com/vod/play | . . . | . . . | . . . | | . . . | . . . |

In Step 240, the video clip address corresponding to the information content is acquired.

In the present embodiment, when the video summary field or the product summary field stores information content that corresponds to the query keyword, the video clip corresponding to the information content is acquired, wherein the address of the video clip associated with the query keyword may be one or more.

For example, when the query keyword received by the server is "北京遇上西雅图 (Finding Mr. Right)", addresses of video clips that are stored in the video product index database and that correspond to all products appeared in the film "北京遇上西雅图" are associated with the query keyword "北京遇上西雅图 (Finding Mr. Right)"; when the query keyword received by the server is "Lenovo K900", addresses of all video clips which are stored in the video product index database and in which the mobile phone Lenovo K900 appeared are associated with the query keyword "LenovoK900".

As shown in Table 2, the address of the video clip corresponding to the query keyword "北京遇上西雅图 (Finding Mr. Right)" is:
www.example01.com/vod/play In Step 250, video abstract information and product abstract information corresponding to the video clip address are acquired.

In the present embodiment, the video abstract information may be all or part of the video summary information; and the product abstract information may be all or part of the product summary information.

Preferably, when the query keyword corresponds to the video summary information and the product summary information, the video abstract information and the product abstract information acquired are not completely identical.

Of course, those skilled in the present art shall understand that the kinds and numbers of the video abstract information and the product abstract information may be preset according to the actual situation, to which no limit is made.

For example, as shown in Table 2, the video abstract information corresponding to "www.example01.com/vod/play" is the video clip thumbnail "example.bmp" and the starting and ending time of the video clip "13:02-15:20"; the product abstract information corresponding to "www.example01.com/vod/play" is the product name "Lenovo K900", product introduction "Price 2580" and the address of the product details page "www.example.html".

In Step 260, the number of the acquired video clips is statistically determined.

In the present embodiment, the number of the acquired video clips is calculated according to the video clip address acquired.

In Step 270, the video clip address, the product abstract information, the video abstract information and the video clip quantity information are gathered to constitute the second search result.

In the present embodiment, the video clip address, the product abstract information, the video abstract information and the video clip quantity information acquired are gathered according to a predetermined manner to constitute the second search result. Preferably, the foregoing information acquired is gathered according to an organization form of structural data.

In Step 280, the first search result and the second search result are pushed to the client.

In a preferred implementation of the present embodiment, the video summary information also includes a video type tag. For example, videos corresponding to all products appeared in the video "北京遇上西雅图 (Finding Mr. Right)" are classified into different types such as "Tang Wei Modeling", "Wu Xiubo Modeling", "Automobile/Decoration", "Shopping Mall/Attractions" or the like. Different video type tags are added to video summary information corresponding to different videos. As shown in Table 2, a type tag "Automobile/Decoration" may be added for the video clip address "www.example01.com/vod/play".

In the present preferred implementation, the Step 280 further includes: classifying the second search result according to the video type tag; and pushing the classification result to the client.

In the present embodiment, after the second search result is pushed to the client, the second search result may be displayed in the client according to a predetermined display mode, based on a browser used by the client and the data organization form of the second search result.

Figure 3:
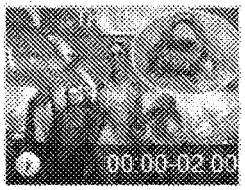
FIG. 3 is a schematic diagram of a human-computer interaction interface in the information search method according to the second embodiment of the present invention.

FIG. 3 shows a schematic diagram displayed by a human-computer interaction interface. As shown in FIG. 3, the query keyword received by the search engine server is "北京遇上西雅图 (Finding Mr. Right)", the second search result pushed includes thumbnails of all video clips associated with the query keyword "北京遇上西雅图 (Finding Mr. Right)", which are displayed according to different classification tags, and the starting and ending time of all video clips in the whole video "北京遇上西雅图 (Finding Mr. Right)" are displayed in the thumbnail of the video clip. The video clip addresses are pushed to the client in the form of hyperlinks of the thumbnails of video clips. When users click on the thumbnail of a video clip, the corresponding video clip is played. The second search result pushed also includes product name and product introduction corresponding to the video clip, where the address of the product details page is pushed to the client in the form of the hyperlink of the product name. Users will access the product details page when they click on the product name. Preferably, the product details page provides: multi-picture product demonstration, detailed product introduction, user purchasing comments, purchasing entrance, all video clips in which the product appeared, etc. Additionally, the number of videos in the second search result is pushed to the client in the form of "viewing all the eleven related commodities".

With respect to user demand (1) mentioned in the BACKGROUND, the present embodiment method mainly has the following advantages:

[1] Guaranteed Recall: when the search engine cooperates with video websites, it is possible to recall and include, by the search engine, video clips provided by the video websites, in which products appeared. Guaranteed by resources of the video websites, users' large demands for video products may be satisfied.

[2] More Guaranteed Accuracy Rate: the search engine cooperates with the video websites, a great amount of information on video products provided by an official website is included. The accuracy rate is very high due to copyright protection.

[3] Users may only need to know the video name to acquire all product information in the video by using the client without accurate product description information, which reduces requirements to users and improves the search efficiency.

[4] What You See is What You Get (WYSIWYG): the client can definitely determine whether the product displayed in the video is the target product as initially desired according to the video clips provided by the search engine, basically without any deviation.

Figure 4:
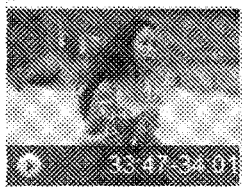
FIG. 4 is a schematic diagram of a human-computer interaction interface in the information search method according to the second embodiment of the present invention.

FIG. 4 shows a schematic diagram displayed by a human-computer interaction interface. As shown in FIG. 4, the query keyword received by the search engine server is "Lenovo K900", the second search result pushed includes thumbnails of all video clips associated with the query keyword "Lenovo K900". All the thumbnails are displayed according to different classification tags ("Movie", "Teleplay", "Variety" and "Entertainment"), and the starting and ending time of all video clips in the whole video are displayed in the thumbnails of the video clips. The video clip address is pushed to the client in the form of hyperlinks of the thumbnails of video clips. When users click on the thumbnail of a video clip, the corresponding video clip is played. The second search result pushed also includes the product name and the product introduction corresponding to the video clip, wherein the address of the product details page is pushed to the client in the form of the hyperlink of the product name. Users will access the product details page when they click on the product name. Preferably, the product details page provides multi-picture product demonstration, detailed product introduction, user purchasing comments, purchasing entrance, all video clips in which the product appeared, etc. Additionally, the number of videos in the second search result is pushed to the client in the form of "viewing all the 11 related videos".

With respect to user demand (2) mentioned in the BACK-GROUND, main advantages of the present embodiment method are listed as below.

[1] Video clips corresponding to the product are provided on the basis of search of the product by the client, so that real applications of the focus on the product under different scenes are obtained by the client.

[2] Videos provided to the client are not pure advertising films, but also include other real videos displaying the product, for example, movies or street snap of stars, etc., and the scenes for appearance of products are more abundant and diversified.

[3] By means of cooperation with the official video website, all the video clips provided to the client are issued publicly, thus have high authenticity and credibility.

[4] Timeliness and controllability are high. Information addition may be completed before the videos is issued publicly. When a popular video outburst is acquired by means of information such as search index of the search engine or the like, video product information may be added and go into effect after hours.

The following is an embodiment of the information search device provided by the embodiments of the present invention. The embodiment of the search device and the foregoing embodiment of the search method belong to the same conception. Detailed content not described in detail in the embodiment of the search device may be clear by reference to the foregoing embodiment of the search method.

Embodiment III

Figure 5:
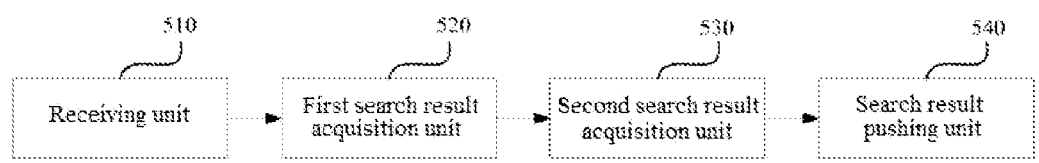
FIG. 5 is a structural schematic diagram of the information search device according to a third embodiment of the present invention.

FIG. 5 is a structural schematic diagram of the information search device according to the third embodiment of the present invention. As shown in FIG. 5, the device includes: a receiving unit 510, used for receiving a query keyword from a client; a first search result acquisition unit 520, used for acquiring, in a regular index database, a first search result associated with the query keyword; a second search result acquisition unit 530, used for querying, according to the query keyword, video summary information and product summary information in a video product index database to acquire a second search result associated with the query keyword, wherein the second search result includes an address of a video clip associated with the query keyword, and the video product index database includes the address of the video clip, the video summary information corresponding to the video clip, and the product summary information corresponding to a product demonstrated in the video clip; and a search result pushing unit 540, used for pushing the first search result and the second search result to the client.

In a preferred implementation of the present embodiment, the second search result acquisition unit is further used for acquiring video abstract information and/or product abstract information corresponding to the video clip, wherein the video abstract information is a subset of the video summary information, and the product abstract information is a subset of the product summary information.

In a preferred implementation mode of the present embodiment, the video summary information further includes a video type tag; and the search result pushing unit further includes: a video type classification subunit (not shown), used for classifying the second search result according to the video type tag; and a video classification result pushing subunit (not shown), used for pushing a classification result to the client.

In a preferred implementation mode of the present embodiment, the product summary information further includes a product type tag; and the search result pushing unit further includes: a product type classification subunit (not shown), used for classifying the second search result according to the product type tag; and a product classification result pushing subunit (not shown), used for pushing a classification result to the client.

The search device provided by the embodiments of the present invention pre-establishes a video product index database, and acquires the search result in the foregoing video product index database, in addition to the search result in the regular index database when the query keyword of the client is received. After inputting the search keyword, the user may acquire information on various products appeared in a certain video and video clip information corresponding to various products, or product information corresponding to a certain product and video clip information in which the product appeared, thereby improving the user's search efficiency, enriching a search result of a querying, and shortening a gap between the search result and the user's actual query demand.

Figure 6:
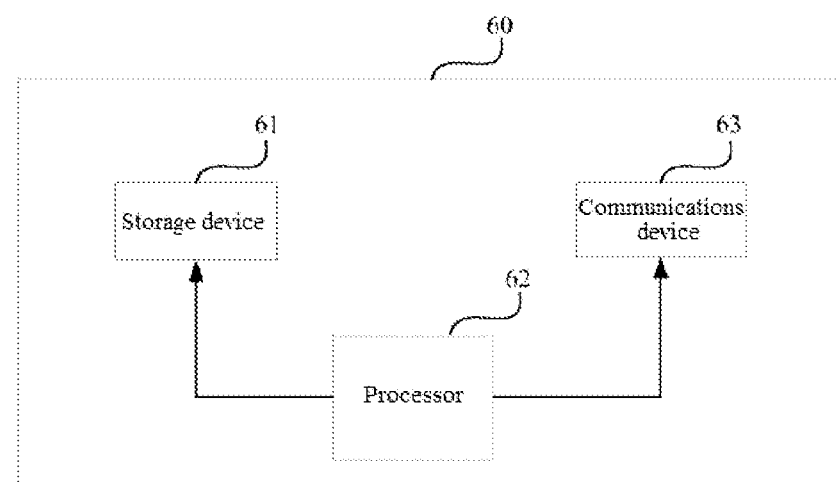
FIG. 6 is a structural schematic diagram of a server available for implementation of the solution in the present invention.

FIG. 6 is a structural schematic diagram of the server available for implementation of the solution in the present invention. The server 60 may be used for implementing the method provided in the above embodiments. Typically, the server 60 includes at least one processor 61, at least one storage device 62 and a communications device 63.

The storage device 62 may be used for storing programs and data. The processor 61 may execute various instructions and corresponding data processing by reading and/or running the data and programs stored in the storage device 62. The programs stored in the storage device 62 include an operating system, at least one application required for a function or step and the like. The data stored in the storage device 62 include a great number of data in the foregoing video product index database.

The communications device 63 may be used for transmitting and receiving data by means of a wireless/wired mode. Preferably, the communications device 63 is a wireless communications device based on wireless communications technologies (for example, GPRS (General Packet Radio Service), CDMA (Code Division Multiple Access), WCDMA (Wideband Code Division Multiple Access), LTE (Long Term Evolution), Wi-Fi Bluetooth or the like for transmitting and receiving data.

Obviously, those skilled in the art should understand that foregoing various modules and steps of the present invention may be implemented by the server as mentioned above. Alternatively, the embodiments of the present invention may be achieved by computer unit executable programs so that the programs are stored in the storage device and are executed by the processor. The programs may be stored in a computer-readable storage medium, and the foregoing storage medium may be a read-only memory, a magnetic disk or an optical disk, etc. Or the programs are respectively made into various integrated circuit modules, or a plurality of modules or steps in the programs are made into a single integrated circuit module and thus achieved. Thus, the present invention does not limit combination of any particular hardware and software. On the basis of such an understanding, the technical solution of the present invention in essence or the part thereof constituting contribution to the prior art may be embodied in the form of software products, which may be stored in storage media, such as ROM/RAM, diskettes or optical disks and the like, including some instructions so that it is possible to execute the method as recited in various embodiments of the present invention by a terminal device (a mobile phone, a computer, a server, or network equipment, etc.). Therefore, the embodiments of the present invention also provide one or more storage media including computer-executable instruction which is used for executing an information search method, the method includes the following steps: receiving a query keyword from a client; acquiring, in a regular index database, a first search result associated with the query keyword; querying, according to the query keyword, video summary information and product summary information in a video product index database to acquire a second search result associated with the query keyword, wherein the second search result includes an address of a video clip associated with the query keyword, and the video product index database includes the address of the video clip, the video summary information corresponding to the video clip, and the product summary information corresponding to a product demonstrated in the video clip; and pushing the first search result and the second search result to the client.

What is mentioned above are a preferred embodiments of the present invention, and is not intended for limiting the present invention. Various modifications and variations of the present invention may be available for the present invention. Any modification, equivalent substitution and improvement or the like made within the spirit and principle of the present invention shall be involved in the scope of protection of the present invention.

What is claimed is:

1. An information search method, comprising:
receiving a query keyword from a client;
acquiring, in a regular index database, a first search result associated with the query keyword;
querying, according to the query keyword, video summary information and product summary information in a video product index database to acquire a second search result associated with the query keyword, wherein the second search result comprises an address of a video clip comprising a product and associated with the query keyword, and the video product index database comprises the address of the video clip, the video summary information corresponding to the video clip, and the product summary information corresponding to a product demonstrated in content of the video clip; and
pushing the first search result and the second search result to the client;
wherein the video summary information comprises a video type tag; and the pushing the first search results and the second search result to the client further comprises:
classifying the second search result according to the video type tag; and
pushing a classification result to the client.

2. The information search method of claim 1, wherein the video summary information comprises a video name corresponding to the video clip, and the product summary information comprises a product name corresponding to the product demonstrated in the content of the video clip.

3. The information search method of claim 2, wherein the second search result further comprises video abstract information, product abstract information, or a combination thereof corresponding to the video clip, the video abstract information is a subset of the video summary information, and the product abstract information is a subset of the product summary information.

4. The information search method of claim 3, wherein the video summary information further comprises a thumbnail corresponding to the video clip.

5. The information search method of claim 3, wherein the product summary information further comprises a product introduction and an entry address of a product details page corresponding to the product name.

6. The information search method of claim 3, wherein the product summary information further comprises a product type tag; and the step of pushing the first search result and the second search result to the client further comprises:
classifying the second search result according to the product type tag; and
pushing a classification result to the client.

7. An information search device, comprising:
a processor; and
a memory storing computer-readable instructions;
wherein, when the computer-readable instructions are executed by the processor, the processor is configured to:
receive a query keyword from a client;
acquire, in a regular index database, a first search result associated with the query keyword;
query, according to the query keyword, video summary information and product summary information in a video product index database to acquire a second search result associated with the query keyword, wherein the second search result comprises an address of a video clip comprising a product and associated with the query keyword, and the video product index database comprises the address of the video clip, the video summary information corresponding to the video clip, and the product summary information corresponding to a product demonstrated in content of the video clip; and
push the first search result and the second search result to the client;
wherein the video summary information comprises a video type tag; and the processor is further configured to:
classify the second search result according to the video type tag; and
push a classification result to the client.

8. The information search device of claim 7, wherein the video summary information comprises a video name corresponding to the video clip, and the product summary information comprises a product name corresponding to the product demonstrated in the content of the video clip.

9. The information search device of claim 8, wherein the processor is further configured to acquire video abstract information, product abstract information, or a combination thereof corresponding to the video clip, wherein the video abstract information is a subset of the video summary information, and the product abstract information is a subset of the product summary information.

10. The information search device of claim 9, wherein the video summary information further comprises a thumbnail corresponding to the video clip.

11. The information search device of claim 9, wherein the product summary information further comprises a product introduction and an entry address of a product details page corresponding to the product name.

12. The information search device of claim 9, wherein the product summary information further comprises a product type tag; and the processor is further configured to:

classify the second search result according to the product type tag; and push a classification result to the client.

13. One or more non-transitory storage media comprising a computer-executable instruction, the computer-executable instruction being configured to be used for executing an information search method comprising the following steps:

receiving a query keyword from a client;

acquiring, in a regular index database, a first search result associated with the query keyword;

querying, according to the query keyword, video summary information and product summary information in a video product index database to acquire a second search result associated with the query keyword, wherein the second search result comprises an address of a video clip comprising a product and associated with the query keyword, and the video product index database comprises the address of the video clip, the video summary information corresponding to the video clip, and the product summary information corresponding to a product demonstrated in content of the video clip; and pushing the first search result and the second search result to the client;

wherein the video summary information comprises a video type tag; and the pushing the first search result and the second search result to the client further comprises:

classifying the second search result according to the video type tag; and pushing a classification result to the client.

* * * * *